United States Patent
Matsunaga et al.

(10) Patent No.: US 10,984,550 B2
(45) Date of Patent: Apr. 20, 2021

(54) IMAGE PROCESSING DEVICE, IMAGE PROCESSING METHOD, RECORDING MEDIUM STORING IMAGE PROCESSING PROGRAM AND IMAGE PICKUP APPARATUS

(71) Applicant: OLYMPUS CORPORATION, Hachioji (JP)

(72) Inventors: Takuya Matsunaga, Akiruno (JP); Tatsuya Kino, Kodaira (JP); Yoshiyuki Fukuya, Sagamihara (JP); Nobuyuki Shima, Machida (JP); Kazuhiko Osa, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 232 days.

(21) Appl. No.: 16/364,897

(22) Filed: Mar. 26, 2019

(65) Prior Publication Data

US 2019/0304122 A1     Oct. 3, 2019

(30) Foreign Application Priority Data

Mar. 27, 2018  (JP) .............................. JP2018-060093

(51) Int. Cl.
| | |
|---|---|
| *G06T 7/70* | (2017.01) |
| *G06T 7/50* | (2017.01) |
| *G06F 9/30* | (2018.01) |
| *G06F 3/0481* | (2013.01) |
| *H04N 5/232* | (2006.01) |

(52) U.S. Cl.
CPC .............. *G06T 7/70* (2017.01); *G06F 3/0481* (2013.01); *G06F 9/3004* (2013.01); *G06T 7/50* (2017.01); *H04N 5/23229* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,818,975 | A * | 10/1998 | Goodwin | H04N 1/4072 382/274 |
| 8,213,711 | B2 * | 7/2012 | Tam | H04N 13/261 382/162 |
| 9,129,381 | B2 * | 9/2015 | Steinberg | H04N 5/232 |
| 9,741,125 | B2 * | 8/2017 | Baruch | G06T 7/187 |
| 9,743,057 | B2 * | 8/2017 | Cote | H04N 5/23254 |
| 9,749,547 | B2 * | 8/2017 | Venkataraman | G02B 3/0062 |

(Continued)

FOREIGN PATENT DOCUMENTS

JP     2010-050592 A    3/2010

*Primary Examiner* — Anand P Bhatnagar
(74) *Attorney, Agent, or Firm* — Volpe Koenig

(57) ABSTRACT

An image processing device includes a signal processing device, and the signal processing device is configured to perform distance determination processing of determining, based on a depth map concerning an image displayed on a display, an image portion inside a target distance range which is a predetermined distance range in the image, and an image portion outside the target distance range, and perform image processing of subjecting at least the image portion outside the target distance range to image processing of monotonizing visibility based on a determination result of the distance determination processing and displaying the image on the display.

17 Claims, 13 Drawing Sheets

(56) References Cited

U.S. PATENT DOCUMENTS

| | | | |
|---|---|---|---|
| 10,007,412 B2* | 6/2018 | Tao | H04N 19/85 |
| 2010/0080448 A1* | 4/2010 | Tam | G06T 7/50 |
| | | | 382/154 |
| 2013/0321675 A1* | 12/2013 | Cote | H04N 9/04561 |
| | | | 348/242 |
| 2016/0381335 A1* | 12/2016 | Tao | G06F 3/04845 |
| | | | 348/575 |

* cited by examiner

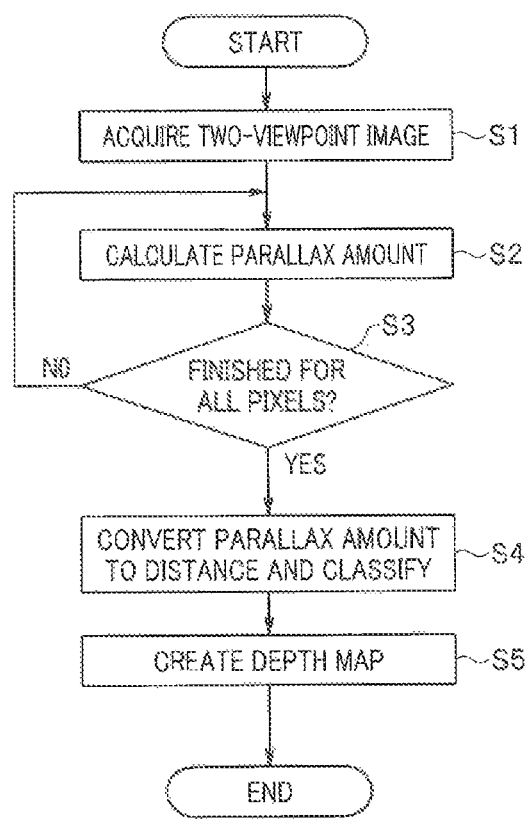

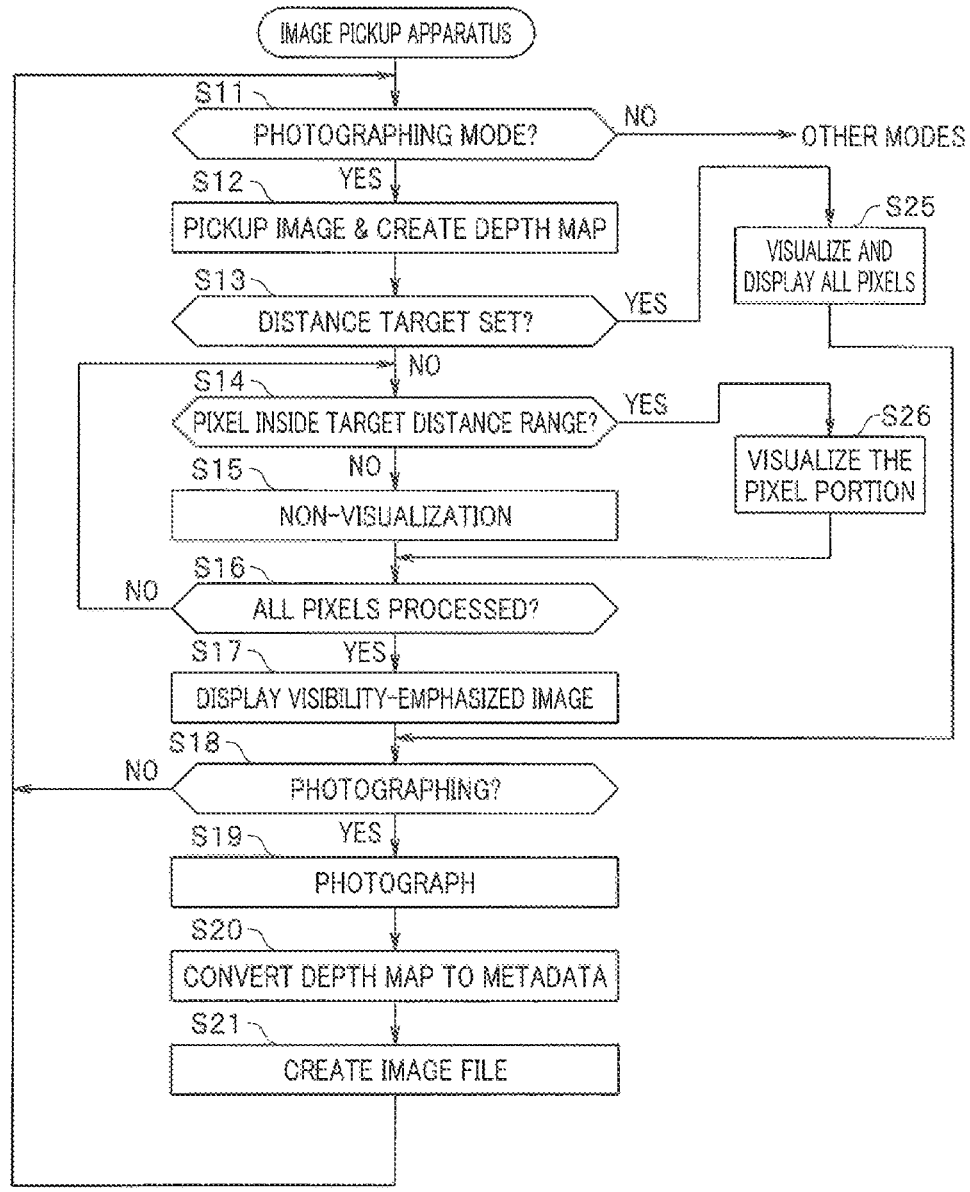

IMAGE PROCESSING DEVICE, IMAGE PROCESSING METHOD, RECORDING MEDIUM STORING IMAGE PROCESSING PROGRAM AND IMAGE PICKUP APPARATUS

CROSS REFERENCE TO RELATED APPLICATION

This application is based upon and claims the benefit of priority from the prior Japanese Patent Application No. 2018-060093 filed in Japan on Mar. 27, 2018; the entire contents of which are incorporated herein by reference.

BACKGROUND OF THE INVENTION

1. Field of the Invention

The present invention relates to an image processing device, an image processing method, a recording medium having an image processing program stored in the recording medium, and an image pickup apparatus that are configured to enhance visibility of a main object.

2. Description of the Related Art

In recent years, portable equipment (image pickup apparatus) having a photographing function such as a digital camera and a smartphone have been popularized. This type of image pickup apparatus includes a display unit having a function of displaying a picked-up image.

However, portable equipment such as a digital camera or a smartphone has a display panel having a relatively small size, and thus it is difficult to check a photographing target on the screen of the display panel. In addition to the point that a displayed image is relatively small, external light impinges against the display panel and is reflected from the display panel or the like, which causes a problem that the image pickup target is difficult to see in a particularly cluttered scene.

Therefore, Japanese Patent Application Laid-Open Publication No. 2010-50592 discloses a technique that facilitates discrimination between an in-focus object and an out-of-focus object, thereby facilitating focusing.

SUMMARY OF THE INVENTION

An image processing device according to an aspect of the present invention comprises a signal processing device, wherein the signal processing device is configured to perform distance determination processing of determining, based on a depth map regarding an image for display on a display, an image portion inside a target distance range which is a predetermined distance range in the image, and an image portion outside the target distance range, and perform image processing of subjecting at least the image portion outside the target distance range to image processing of monotonizing visibility based on a determination result of the distance determination processing and displaying the image on the display.

An image pickup apparatus according to an aspect of the present invention comprises: the above image processing device, the display, and an image pickup unit configured to pick up an image for display on the display.

An image processing method according to an aspect of the present invention comprises, based on a depth map regarding an image for display on a display, determining an image portion inside a target distance range which is a predetermined distance range in the image, and an image portion outside the target distance range, and based on a determination result of the distance determination processing, subjecting at least the image portion outside the target distance range to image processing of monotonizing visibility to display the image on the display.

A non-transitory computer-readable recording medium according to an aspect of the present invention stores an image processing program for causing a computer to execute a procedure comprising: based on a depth map concerning an image for display on a display, determining an image portion inside a target distance range which is a predetermined distance range in the image, and an image portion outside the target distance range; and based on a determination result of the distance determination processing, subjecting at least the image portion outside the target distance range to image processing of monotonizing visibility to display the image on the display.

An image processing device according to another aspect of the present invention is an image processing including a signal processing device, wherein the signal processing apparatus is configured to perform distance determination processing of determining, based on a depth map concerning an image for display on a display, an image portion inside a target distance range which is a predetermined distance range in the image, and an image portion outside the target distance range, perform image analysis processing of detecting an object in the image displayed on the display, perform tracking processing of tracking movement in the image of a specific object detected in the image analysis processing, and perform image processing of subjecting at least the image portion outside the target distance range to image processing of monotonizing visibility based on a determination result of the distance determination processing to display the image on the display, and excluding a specific object under tracking in the tracking processing from targets of the image processing of monotonizing visibility even when the specific object is located outside the target distance range.

An image processing method according to another aspect of the present invention comprises: determining, based on a depth map concerning an image for display on a display, an image portion inside a target distance range which is a predetermined distance range in the image, and an image portion outside the target distance range, detecting an object in the image displayed on the display, tracking movement in the image of a specific object detected by the detection of the object, and performing image processing of subjecting at least the image portion outside the target distance range to image processing of monotonizing visibility based on a determination result of the determination to display the image on the display, and excluding a specific object under tracking in the tracking processing from targets of the image processing of monotonizing visibility even when the specific object is located outside the target distance range.

A non-transitory computer-readable recording medium according to another aspect of the present invention stores an image processing program for causing a computer to execute a procedure comprising: determining, based on a depth map concerning an image for display on a display, an image portion inside a target distance range which is a predetermined distance range in the image, and an image portion outside the target distance range; detecting an object in the image for display on the display; tracking movement in the image of a specific object detected by the detection of the object; and performing image processing of subjecting at least the image portion outside the target distance range to image processing of monotonizing visibility based on a determination result of the determination to display the image on the display, and excluding a specific object under tracking in the tracking processing from targets of the image processing of monotonizing visibility even when the specific object is located outside the target distance range.

BRIEF DESCRIPTION OF THE DRAWINGS

FIG. 6 is a flowchart showing an example of a method of creating a depth map in a depth map creating unit 12b;

FIG. 7 is a flowchart showing processing of an image processing device 10;

DETAILED DESCRIPTION OF THE PREFERRED EMBODIMENT(S)

Embodiments of the present invention will be described hereinafter in detail with reference to the drawings.

First Embodiment

Figure 1:
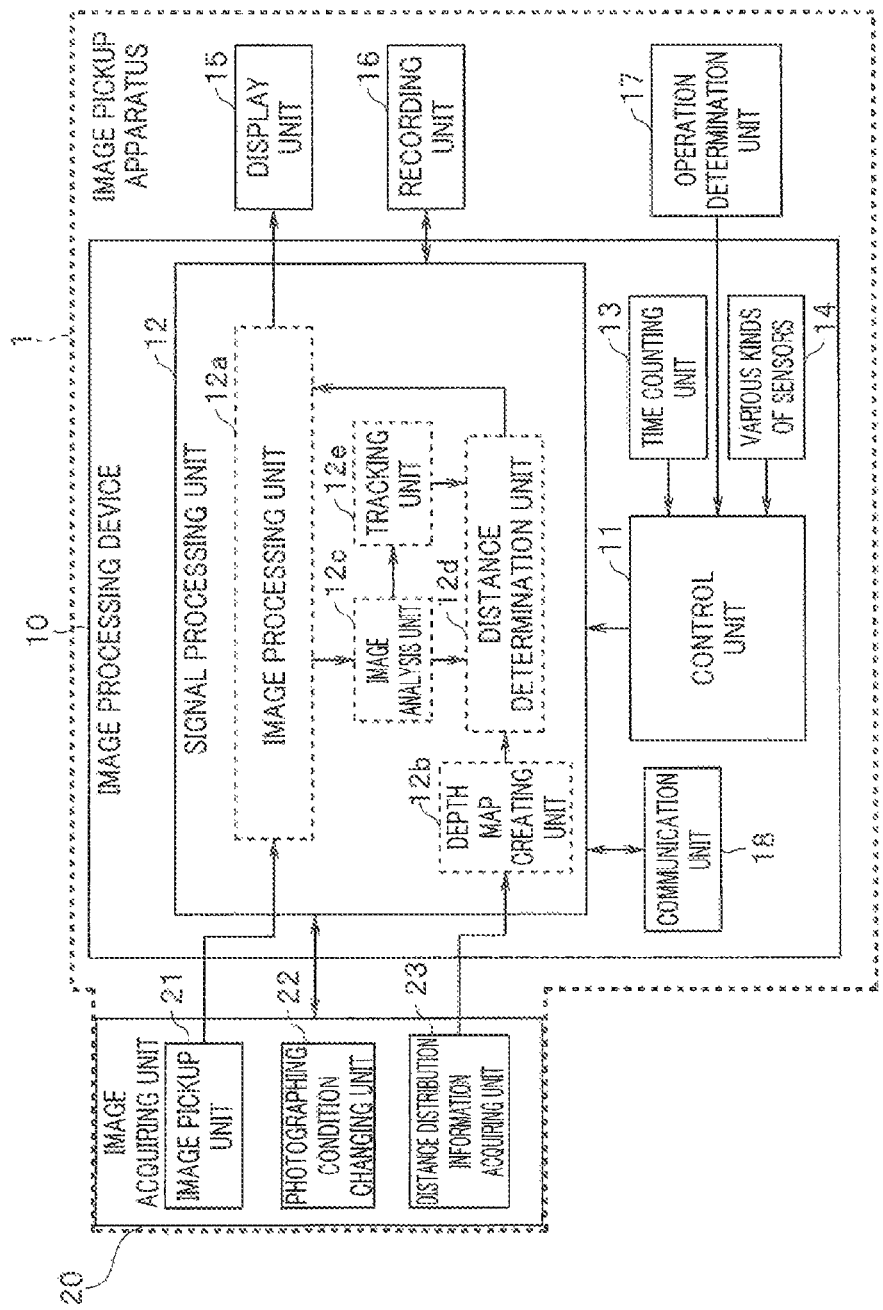
FIG. 1 is a block diagram showing a circuit configuration of an image pickup apparatus incorporating an image processing device according to a first embodiment of the present invention.

FIG. 1 is a block diagram showing a circuit configuration of an image pickup apparatus in which an image processing device according to a first embodiment of the present invention is incorporated. In the present embodiment, a depth map (distance image) representing a distribution of the distances to objects (hereinafter referred to as "object distances") is used to surely differentiate the visibility between an object having an object distance belonging to a predetermined distance range (hereinafter referred to as "target distance range") (hereinafter referred to as "object inside target distance") and an object having an object distance which does not belong to a target distance range (hereinafter referred to as "object outside target distance") by image processing. For example, in the present embodiment, only objects inside target distance belonging to a predetermined target distance range including an object distance to a main object are visualized, and other objects outside target distance which do not belong to the target distance range are made invisible (non-visualized), whereby the visibility of the main object can be remarkably enhanced.

For example, even when it is attempted to pick up an image of a bird as a main object, the image of the bird is difficult to see on the screen due to an influence of forest or the like which is a background, and thus it may be difficult to capture the bird in a photographing range. Alternatively, even when an image of a runner running in a footrace as a main object is picked up or the like, the image of the runner becomes difficult to see on the screen due to an influence of a background of an audience, etc., so that it may be difficult to pick up an image of the runner.

That is, in the present embodiment, for example, processing of reducing visibility is performed on at least objects outside target distance. The processing of reducing the visibility includes processing of lowering the contrast, blurring processing, processing of lowering saturation or the like, and non-visualization may be considered as the most prominent processing.

Furthermore, it cannot be surely said that the processing of making black as non-visualization reduces the visibility in term of the whole screen because "black" clearly appears on the screen. However, "black" is displayed as being simplified or monotonized like a screen, and image representation is different between a main object as a specific target passing between screens on front and back sides and the screens, so that the main object can be seen well. Considering the foregoing situation contrarily, it can be also said that it is difficult to discriminate what other objects than the specific target are, and thus the visibility of the other objects is reduced. In the present application, use of terms "reduction" and "deterioration" of visibility for an effect of the processing on monotonously represented portions is to express such a meaning. Since the other objects than the specific target are made different from the specific target by simplifying or monotonizing the image representation of the other objects, it is not necessary to consciously see what the other objects than the specific object are. By adopting such a display method, it is possible to highlight an object displayed realistically and facilitate observation, tracking and photographing by differentiating the image representation in the screen (partial adaptive type image processing).

Note that in the present embodiment, visibility or discrimination may be changed according to a distance distribution to make visibility and image representation different between an object inside target distance and an object outside target distance. Furthermore, according to an environment in which a main object is placed, how to make the main object easier to be seen may be changed due to the arrangement of miscellaneous objects, the relationship of the miscellaneous objects with the main object, and movements of the miscellaneous objects and the main object. Therefore, a device of changing the image processing according to the scene may be considered, and it may be sometimes considered that special effect processing such as emphasis display to enhance the visibility of the objects inside target distance is performed. For this scene determination, analysis of the image may be performed, or the depth map may be used.

The present embodiment aims to make an object inside target distance conspicuous and make the object easier to see. In the following description, for this purpose, not only the image processing for enhancing visibility of the object inside target distance, but also image processing for reducing or monotonizing visibility of an object outside target distance is also referred to as visibility emphasis processing, and an image based on the visibility emphasis processing is referred to as visibility-emphasized image.

Figure 2A:
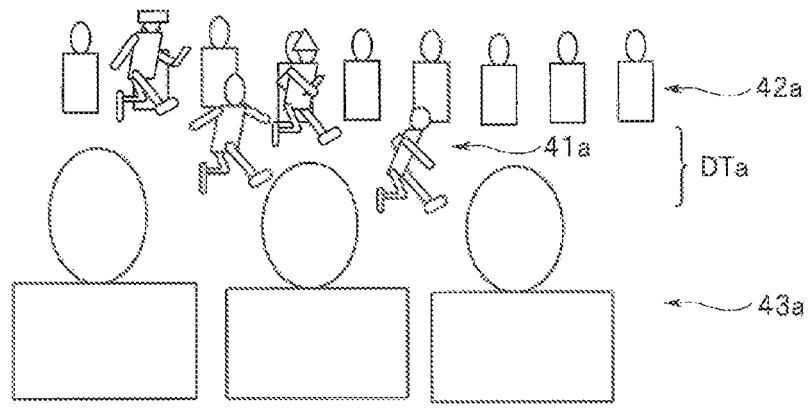
FIG. 2A is an explanatory diagram showing a picked-up image obtained by a general image pickup apparatus.
Figure 2B:
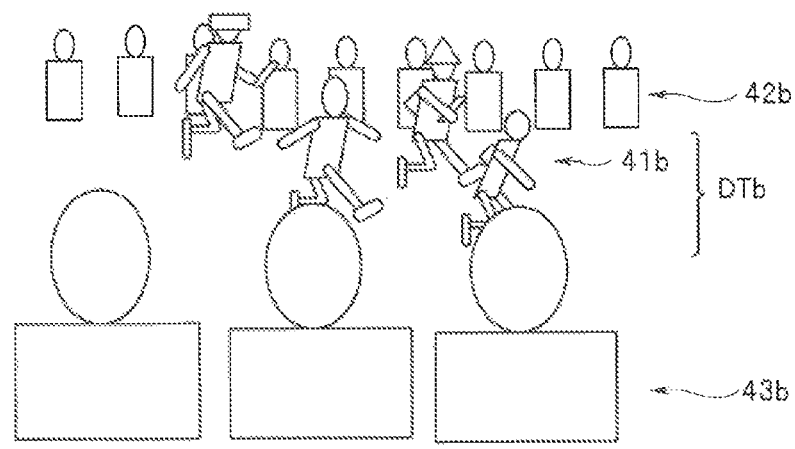
FIG. 2B is an explanatory diagram showing a picked-up image obtained by a general image pickup apparatus.
Figure 2C:
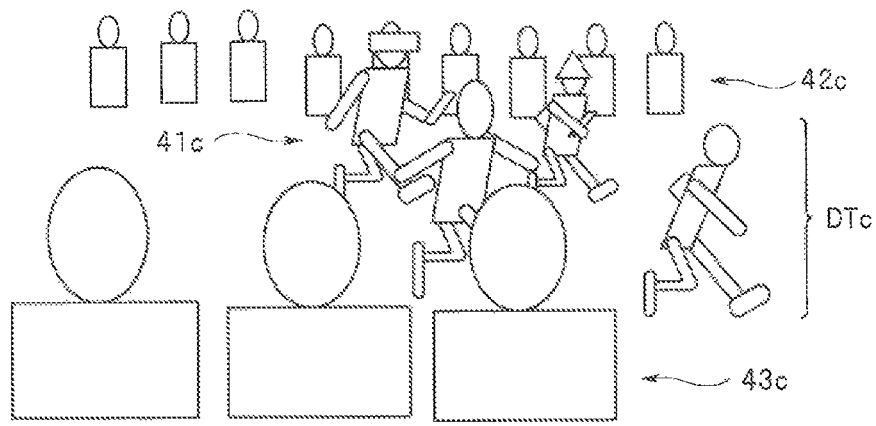
FIG. 2C is an explanatory diagram showing a picked-up image obtained by a general image pickup apparatus.

An outline of the visibility-emphasized image according to the present embodiment will be described with reference to explanatory diagrams of FIGS. 2A to 2C and FIGS. 3A to 3C. FIGS. 2A to 2C show picked-up images obtained by photographing a footrace with a general image pickup apparatus. In FIG. 2A to FIG. 2C, plural runners which are main objects exist between a group of plural spectators on a near side of the image pickup apparatus and a group of plural spectators on a far side of the image pickup apparatus.

The picked-up image of FIG. 2A includes an image 41a of plural runners between an image 43a of plural spectators on the near side and an image 42a of plural spectators on a far side. FIG. 2B shows a picked-up image after a predetermined time has elapsed from a photographing time in FIG. 2A, and FIG. 2C shows a picked-up image after a predetermined time has elapsed from a photographing time in FIG. 2B.

The picked-up image of FIG. 2B includes an image 41b of plural runners between an image 43b of plural spectators on the near side and an images 42b of plural spectators on the far side. The picked-up image of FIG. 2C includes an image 41c of plural runners between an image 43c of plural spectators on the near side and an image 42c of plural spectators on the far side.

In the examples of FIGS. 2A to 2C, the images 41a to 41c (representatively, referred to as the image 41) of the runners are located between images 43a to 43c (representatively referred to as the image 43) of the spectators on the near side and images 42a to 42c (representatively, referred to as the image 42) of the spectators on the far side in terms of the distance, but located at overlapping positions on a two-dimensional plane, so that the image 41 of the runners overlap the images 42 and 43 of the spectators, and thus is difficult to see. When the images shown in FIGS. 2A to 2C are displayed on a relatively small display panel of the image pickup apparatus, a photographing operation of fitting the runners within a photographing range or focusing on the runners may be hindered because the image 41 of the runners is difficult to see.

Figure 3A:
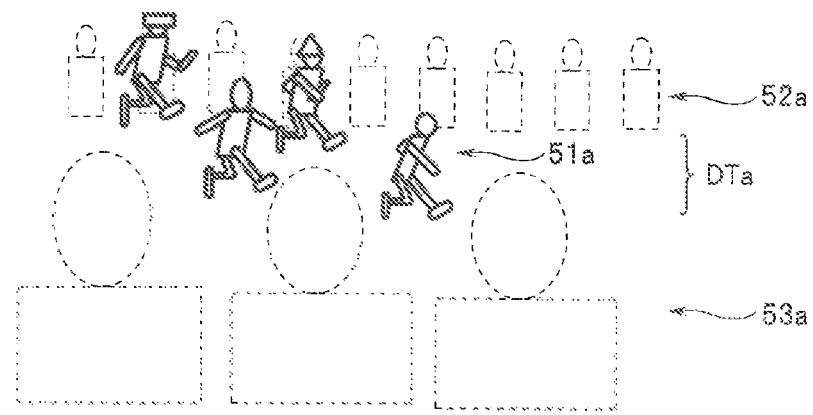
FIG. 3A is an explanatory diagram showing a visibility-emphasized image.
Figure 3B:
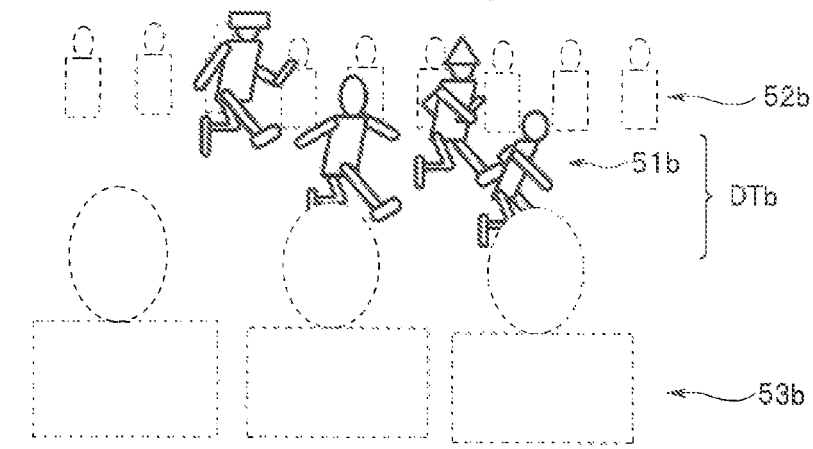
FIG. 3B is an explanatory diagram showing a visibility-emphasized image.
Figure 3C:
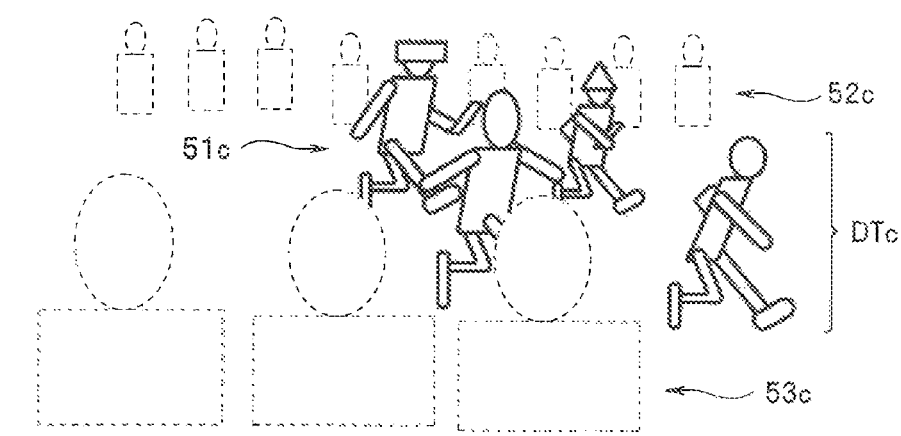
FIG. 3C is an explanatory diagram showing a visibility-emphasized image.

Therefore, in the present embodiment, visibility-emphasized images shown in FIGS. 3A to 3C are adopted. The picked-up image of FIG. 3A includes an image of plural runners between an image 53a of plural spectators on the near side and an image 52a of plural spectators on the far side. The picked-up image of FIG. 3B includes an image 51b of plural runners between an image 53b of plural spectators on the near side and an image 52b of plural spectators on the far side. The picked-up image shown in FIG. 3C includes an image 51c of plural runners between an image 53c of plural spectators on the near side and an image 52c of plural spectators on the far side.

In the present embodiment, as indicated by broken lines in FIGS. 3A to 3C, the images 53a to 53c (representatively referred to as the image 53) of the spectators on the near side and the images 52a to 52c (representatively referred to as the image 52) on the far side are subjected to image processing for monotonizing and reducing the visibility of the images. That is, in the present embodiment, for example, an object distance range DTa in which the runners as the main objects in FIG. 2A exist, an object distance range DTb in which the runners as the main objects in FIG. 2B exist, and an object distance range DTc in which the runners as the main objects in FIG. 2C exist are set as target distance ranges, and the images 53 and 52 of the spectators on the near side and the spectators on the far side who are objects outside target distance and do not belong to the target distance range are subjected to the image processing of monotonizing the visibility to reduce discrimination.

This image processing may be referred to as processing of highlighting specific objects (in this case, the objects inside target distance, or runners). However, when the visibility is enhanced by displaying an object while the object is highlighted so as to be conspicuous, an essential object looks like a different representation from an actual image at the photographing time. Therefore, the visibility of the other objects is reduced in order to make the essential object relatively conspicuous. In addition to the monotonization processing, the representation may be performed by processing of deteriorating visibility, processing of reducing or dropping visibility, or processing of worsening visibility.

As a result, the visibility of the images 51a to 51c (representatively, referred to as the image 51) of the runners who are the objects inside target distance and belong to the target distance range becomes good. For example, when all image portions that include the images 53 and 52 and do not belong to the target distance range are made invisible, for example, displayed at a predetermined level (for example, black level, shaded pattern processing based on processed black level, or white level, specific single color or the like), only the image 51 is visualized and displayed realistically. That is, the objects other than the main objects are simplified, the main objects are not displayed in such an incompact manner that the objects are interspersed, but displayed while clearly differentiated, so that the visibility of the runners who are the main objects can be remarkably enhanced. Accordingly, when such a visibility-emphasized image is displayed on the display panel of the image pickup apparatus, the image pickup operation of fitting the runners within the image pickup range or focusing on the runners is extremely easy.

Note that the target distance range may be preset to a predetermined distance range, or the target distance range may be automatically detected by an operation of specifying a main object, or the target distance range may be changed with movement of the main object by tracking the main object.

(Configuration)

In FIG. 1, the image pickup apparatus 1 is configured by an image processing device 10 and an image acquiring unit 20. In the image pickup apparatus 1, the image processing device 10 and the image acquiring unit 20 may be configured separately from each other. The image processing device 10 is provided with a picked-up image from the image acquiring unit 20. The image processing device 10 is configured to pick up an image from the image acquiring unit 20.

The image acquiring unit 20 is controlled by a signal processing unit 12 of the image processing device 10. An image pickup unit 21 is provided to the image acquiring unit 20. The image pickup unit 21 includes an image pickup device (not shown) such as a CCD or CMOS sensor, and an optical system (not shown) that guides an optical image of an object to an image pickup face of the image pickup device. The optical system is provided with a lens, an aperture and the like for zooming and focusing. A photographing condition changing unit 22 is provided to the image acquiring unit 20, and the photographing condition changing unit 22 drives and controls the image pickup device and the optical system of the image pickup unit 21. For example, the photographing condition changing unit 22 can change the zoom, the focus position, and the aperture by driving a lens for zooming and focusing and an aperture. Furthermore, the photographing condition changing unit 22 can drive and control the image pickup device of the image pickup unit 21 to change the photographing condition.

In the image pickup unit 21, an optical image of an object is given to a light receiving face via the optical system, and the optical image of the object is photoelectrically converted to obtain a picked-up image. The image pickup unit 21 outputs the picked-up image to the image processing device 10 of the image pickup apparatus 1.

In the present embodiment, the image acquiring unit 20 is provided with a distance distribution information acquiring unit 23. The distance distribution information acquiring unit 23 is configured to acquire distance distribution information for generating a depth map (depth map, distance image). Note that the depth map can be said to associate distance-related information with each area of an image.

FIG. 4 and FIGS. 5A to 5C are explanatory diagrams each showing an example of the distance distribution information acquiring unit 23. Various publicly known methods can be adopted as a method of acquiring distance distribution information to an object. FIG. 4 and FIGS. 5A to 5C show an example in which the distance distribution information is acquired based on a stereo image, but the present embodiment is not limited to this example.

Figure 4:
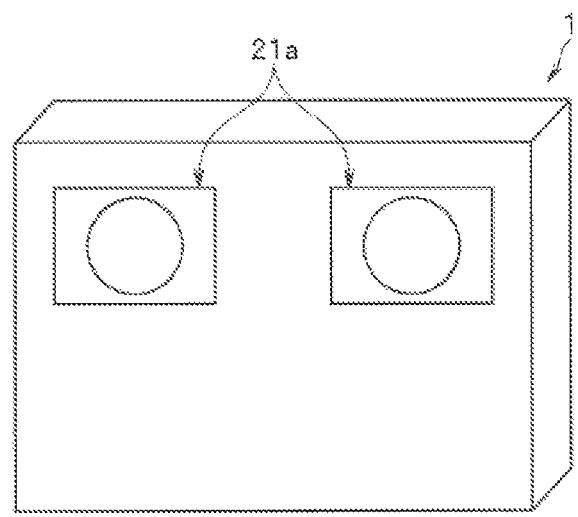
FIG. 4 is an explanatory diagram showing an example of a distance distribution information acquiring unit 23 in FIG. 1.

FIG. 4 shows an example in which a twin-lens system having two separated image pickup units. Two image pickup units 21a configured to acquire a right image and a left image respectively are adopted as the image pickup unit 21. Each of the two image pickup units 21a includes an optical system and a photoelectric conversion unit, and for example, the right image is acquired by image pickup of one image pickup unit 21a while the left image is acquired by image pickup of the other image pickup unit 21a. The two image pickup units 21a are provided to be spaced from each other at a predetermined distance, and the right image and the left image which are acquired by the respective image pickup units 21a are images having parallax therebetween. The distance can be calculated based on a distribution in parallax of the respective portions of the images.

Figure 5A:
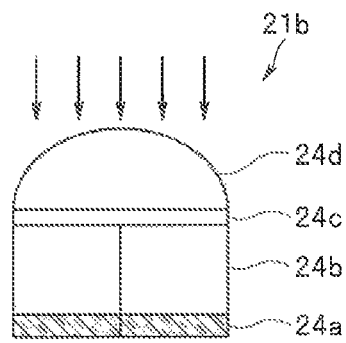
FIG. 5A is an explanatory diagram showing an example of the distance distribution information acquiring unit 23 in FIG. 1.
Figure 5B:
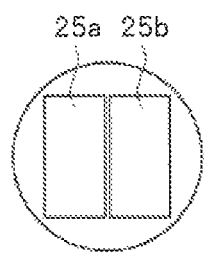
FIG. 5B is an explanatory diagram showing an example of the distance distribution information acquiring unit 23 in FIG. 1.
Figure 5C:
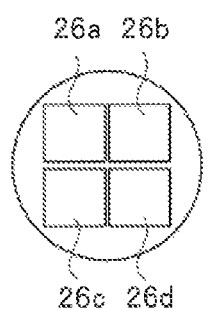
FIG. 5C is an explanatory diagram showing an example of the distance distribution information acquiring unit 23 in FIG. 1.

On the other hand, FIGS. 5A to 5C show an example adopting an image pickup face phase difference method (pupil division phase difference method). In the image pickup surface phase difference method, in addition to pixels for normal image pickup, pixels for focus detection are provided as respective pixels constituting a light receiving portion of the image pickup device. FIG. 5A shows a configuration of one pixel for focus detection of the image pickup device 21b. In the configuration, a wiring portion 24b and a color filter 24c are stacked on a divided light receiving portion 24a, and a microlens 24d is provided on the color filter 24c. A right light flux and a left light flux (arrows) from an object which are incident onto the microlens 24d are incident onto different light receiving surfaces 25a and 25b of FIG. 5B which configure the light receiving portion 24a, respectively. FIG. 5C shows an example in which the light receiving portion 24a is divided into four parts in the up-and-down direction and right-and-left direction. An upper right light flux, an upper left light flux, a lower right light flux, and a lower left light flux from the object which are incident to the microlens 24d are incident onto different light receiving surfaces 26a to 26d, respectively.

Image signals based on respective incident light of the respective light receiving surfaces 25a, 25b, 26a to 26d are out of phase according to a known pixel position and an object distance. That is, the phase differences among the image signals correspond to the object distance, and the object distance of each portion of the image can be calculated from the phase differences among the image signals.

The distance distribution information acquiring unit 23 outputs the acquired distance distribution information to the depth map creating unit 12b of the image processing device 10.

The image processing device 10 is provided with a control unit 11. The control unit 11 may be configured by a processor using CPU or the like and operate in accordance with a program stored in a memory (not shown) to control each unit, or may realize a part or the whole of the function by an electronic circuit of hardware. The control unit 11 is configured to control each unit of the image processing device 10.

The image processing device 10 is provided with a time counting unit 13 and various kinds of sensors 14. The time counting unit 13 generates time information used by the control unit 11. An acceleration sensor, a gyro sensor, a geomagnetic sensor, and the like are provided as the various kinds of sensors 14. Furthermore, an optical sensor for distance measurement may be adopted as the various kinds of sensors 14.

The image processing device 10 is provided with a signal processing unit 12. The signal processing unit 12 is configured to include an image processing unit 12a, a depth map creating unit 12b, an image analysis unit 12c, a distance determination unit 12d, and a tracking unit 12e. Note that the signal processing unit 12 may be configured by a processor using CPU or the like and operate according to a program stored in a memory (not shown) to realize the function of each unit in the signal processing unit 12, or may realize a part or the whole of the function by an electronic circuit of hardware.

The image processing unit 12a is configured to perform predetermined signal processing such as color adjustment processing, matrix conversion processing, noise removal processing, and other various kinds of signal processing on an image from the image pickup unit 21. Furthermore, the image processing unit 12a can perform image composition (image correction) processing on an input picked-up image and output the picked-up image to the display unit 15. The image processing unit 12a can subject the image to visibility emphasis processing in this image composition. Note that the image processing unit 12a can also directly supply the input image to the display unit 15 without performing the image correction.

The display unit 15 is a display having a display screen such as an LCD, and can display a given image on the display screen. Furthermore, the display unit 15 can display various menu displays and the like on the display screen of the display unit 15. Note that the display screen of the display unit 15 is provided, for example, along the back surface of a housing of the image pickup apparatus 1, and a photographer can check a normal through image displayed on the display screen of the display unit 15 at the photographing time or a through image that has been subjected to the visibility emphasis processing by the image processing unit 12a, and can perform the photographing operation while checking these through images or the like.

Furthermore, the image processing unit 12a can also provide a recording unit 16 with the image after the image processing to record the image. For example, an IC memory may be adopted as the recording unit 16. Note that the recording unit 16 is also capable of reproducing the recorded image and can also provide the reproduced image to the image processing device 10.

The image pickup apparatus 1 is also provided with an operation determination unit 17. The operation determination unit 17 generates an operation signal based on a user's operation executed on various switches, such as a shutter button, a function button, and a photographing mode setting provided in the image pickup apparatus 1, and outputs the operation signal to the control unit 11.

A touch panel (not shown) is provided on the display screen of the display unit 15. The touch panel can generate an operation signal according to a position on the display screen pointed by a user's finger and a slide operation. This operation signal is also supplied to the control unit 11 (not shown). The control unit 11 controls each unit based on the operation signal. In this way, the control unit 11 can control each unit including the image correction processing according to a user's instruction.

Furthermore, the image processing device 10 is provided with a communication unit 18. The communication unit 18 communicates with external equipment wirelessly or through a wire, so that information can be transferred between the external equipment and the signal processing unit 12.

In the present embodiment, the image analysis unit 12c of the signal processing unit 12 can perform image analysis on the image from the image processing unit 12a, and detect each object in the picked-up image. The image analysis unit 12c can detect a main object in the picked-up image by classifying respective objects in the picked-up image into the main object and other miscellaneous objects. For example, the image analysis unit 12c may specify a main object by a user's touch operation using the touch panel for the object, and an object located in the center of the screen, an object having a size larger than a predetermined value, a moving object, etc. may be set as main objects. The image analysis unit 12c outputs an analysis result of the image to the distance determination unit 12d and the tracking unit 12e.

The depth map creating unit 12b of the signal processing unit 12 creates a depth map based on the output of the distance distribution information acquiring unit 23.

FIG. 6 is a flowchart showing an example of a depth map creating method in the depth map creating unit 12b. In step S1, the depth map creating unit 12b acquires, for example, two-viewpoint images such as a right image and a left image. The depth map creating unit 12b calculates a parallax amount at each pixel position for the acquired two-viewpoint images (step S2).

The depth map creating unit 12b determines in step S3 whether the calculation of the parallax amount has been completed for all the pixels in the picked-up image. When the calculation has not been completed, the processing is returned to step S2 to repeat the calculation of the parallax amount. When the calculation of the parallax amount has been completed, the depth map creating unit 12b shifts the processing from step S2 to step S4 to calculate a distance from the parallax amount, and classifies distances obtained at respective pixel positions every predetermined distance range. The depth map creating unit 12b creates a depth map representing stepwise the distances at the respective pixel positions according to a classified result (step S5).

The distance determination unit 12d is supplied with information of a depth map from the depth map creating unit 12b to judge the distance of each object analyzed by the image analysis unit 12c, determines whether each object is an object inside target distance belonging to a target distance range or an object outside target distance which does not belong to the target distance range, and outputs a determination result to the image processing unit 12a. In accordance with the determination result of the distance determination unit 12d, the image processing unit 12a performs image processing for deteriorating visibility on at least objects outside target distance, whereby a visibility-emphasized image can be created.

A case where the distance determination unit 12d determines for each object whether the object belongs to the target distance range is described above, but the distance determination unit 12d may judge for each pixel in a picked-up image whether the pixel belongs to the target distance range. In this case, the image processing unit 12a performs image processing for deteriorating visibility on an image portion which does not belong to the target distance range in the picked-up image, whereby a visibility-emphasized image can be created.

Furthermore, when the image processing unit 12a is provided with a determination result as to whether the object belongs to the target distance range, the image processing unit 12a may perform the image processing for deteriorating visibility on image portions other than the objects inside target distance in the target distance range, thereby creating a visibility-emphasized image.

The control unit 11 may control the distance determination unit 12d to preset which range of the distances given by the depth map should be set as the target distance range. For example, the control unit 11 may automatically set the target distance range according to a photographing scene, or may set the target distance range based on a user's specifying operation.

Furthermore, the control unit 11 specifies a main object for setting the target distance range by a touch operation on an object on a through image displayed on the display screen of the display unit 15, and sets a predetermined distance range including the object as the target distance range. Furthermore, instead of the touch operation, an object at a predetermined position such as the center of the image may be determined as a main object for determining the target distance range, an object having the largest size in the image may be determined as a main object for determining the target distance range, or an object having the largest movement in the image may be determined as a main object for determining the target distance range. In this case, the predetermined distance range including the main object described above may be set to a predetermined value, a value fitted to image analysis, a value fitted to a photographing parameter, a value based on the user's specifying operation or the like. For example, in a case where the main object for determining the target distance range moves, when an object moving similarly to the main object exists, the target distance range may be set while a distance range including the moving object and the main object is set as the predetermined distance range. Furthermore, the predetermined distance range including the main object may be set by determining the main object and miscellaneous objects and setting the predetermined distance range according to the distances from the main object to the miscellaneous objects. In this case, a distance from the main object to the miscellaneous objects is set as the predetermined distance range. Furthermore, the predetermined distance range may be changed according to a zooming operation.

Furthermore, the distance determination unit 12d may be configured to change the target distance range according to the movement of the main object. The tracking unit 12e is supplied with an analysis result of the image analysis unit 12c, and configured to be capable of tracking the main object. The tracking unit 12e outputs a tracking result of the main object to the distance determination unit 12d. The distance determination unit 12d determines, from the depth map, the distance corresponding to the position of the main object which changes due to the tracking result, and resets the target distance range according to this result. For example, when it is indicated from the tracking result that the main object comes closer, the target distance range is also changed to a near distance range.

Note that by determining a main object and miscellaneous objects out of the objects, the processing may be performed which ensures sufficient visibility for only the main object within the target distance range, but deteriorates visibility for objects other than the main object even when the objects are within the target distance range.

Figure 8:
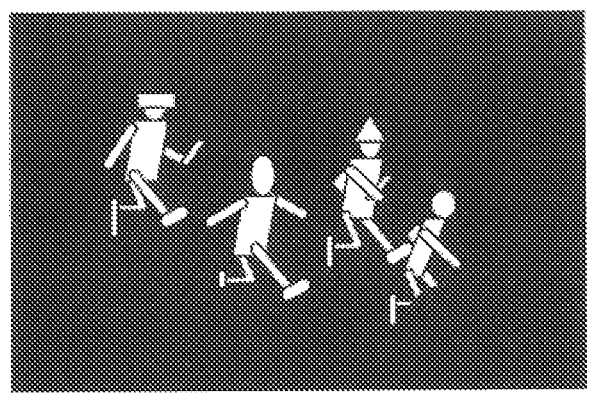
FIG. 8 is an explanatory diagram showing a visibility-emphasized image.

Next, the operation of the thus-configured embodiment will be described with reference to FIGS. 7 and 8. FIG. 7 is a flowchart showing the processing of the image processing device 10. Furthermore, FIG. 8 is an explanatory diagram showing a visibility-emphasized image.

In step S11 of FIG. 7, the control unit 11 determines whether the photographing mode is specified. When the photographing mode is not specified, the control unit 11 executes other specified modes. When the photographing mode is specified, the control unit 11 shifts the processing to step S12 to perform image pickup and create a depth map. That is, under the instruction of the control unit 11, the signal processing unit 12 controls the photographing condition changing unit 22 and the image pickup unit 21 to cause the image acquiring unit 20 to pick up an image of an object with a predetermined photographing parameter. The image pickup unit 21 outputs the picked-up image of the object to the image processing unit 12a of the signal processing unit 12.

The distance distribution information acquiring unit 23 of the image acquiring unit 20 acquires distance distribution information of a stereo image or the like, and outputs the distance distribution information to the depth map creating unit 12b. The depth map creating unit 12b creates a depth map of a picked-up image under image pickup in the image pickup unit 21. That is, the depth map based on the picked-up image is sequentially created simultaneously with the image pickup of the picked-up image by the image pickup unit 21.

By associating the coordinates of these images or maps, it is possible to judge which target is located at which distance. It is possible to analyze whether a scene is a neat scene or a cluttered scene, whether a target object is hidden by or overlapped with others and thus ambiguous, etc. The differentiation (partial adaptive type image processing) in image representation among respective areas or respective portions on the screen, which is a feature of the present embodiment, may be performed according to such a scene.

In next step S13, the control unit 11 determines whether a distance target, that is, a target distance range has been set. When the target distance range has not been set, the control unit 11 determines that display of a visibility-emphasized image is not specified, and shifts the processing to step S25 to perform whole image visualization display, that is, perform normal through-image display. The image processing unit 12a performs predetermined signal processing on a picked-up image and then provides the picked-up image to the display unit 15. In this way, a normal through image is displayed on the display screen of the display unit 15.

On the other hand, when determining in step S13 that the distance target has been set, the control unit 11 shifts the processing to next step S14. In step S14, the distance determination unit 12d determines for each pixel in the picked-up image whether the pixel is a pixel within the target distance range, and outputs a determination result to the image processing unit 12a. For pixels within the target distance range, the image processing unit 12a performs visualization processing in next step S26. Note that the visualization processing may directly output the pixel values of the pixels as they are.

On the other hand, when the pixel in the picked-up image does not belong to the target distance range, the image processing unit 12a performs processing of deteriorating visibility of the pixel outside the target distance range in step S15. For example, the image processing unit 12a performs non-visualization processing on the pixel outside the target distance range. As the non-visualization processing, for example, the image processing unit 12a converts the pixel value of the pixel outside the target distance range to a predetermined black level, and then outputs the converted black level.

In next step S16, the control unit 11 determines whether the processing for all the pixels has been completed. When the processing has not been completed, the control unit 11 returns the processing to step S14 to repeat the processing of steps S14, S15, and S26, and when the processing for all the pixels has been completed, the control unit 11 shifts the processing to step S17 to display a visibility-emphasized image. The visibility-emphasized image from the image processing unit 12a is supplied to the display unit 15, and displayed on the display screen.

Note that in steps S14 to S16 and S26, it is determined on a pixel basis whether to belong to the target distance range. However, as described above, the visibility emphasis processing may be performed by performing this determination on an object basis. Furthermore, the image processing unit 12a may perform visibility emphasis processing of deteriorating visibility on an image portion excluding objects inside target distance.

FIG. 8 shows a display example of a visibility-emphasized image when the visibility emphasis processing of deteriorating visibility is performed on an image portion excluding objects inside target distance. FIG. 8 corresponds to FIG. 3B, and the distance range DTb of FIG. 3B is set as the target distance range. For an image of runners who are objects belonging to this distance range DTb, pixel values of the image are directly used. For the other image portion including an image of spectators as objects who do not belong to the distance range DTb, pixel values of the image portion are set to a predetermined black level. As described above, a visibility-emphasized image displayed on the display screen of the display unit 15 is displayed so that only the image of the runners who are main objects can be viewed, and the other image portion is not displayed, so that the visibility of the image of the runners is remarkably high. Therefore, the user can easily perform composition setting, focus adjustment, etc. by performing photographing while watching a through image based on a visibility-emphasized image on the display screen of the display unit 15.

In step S18 of FIG. 7, the control unit 11 determines whether a photographing operation has been performed. When the photographing operation has been performed, the control unit 11 shifts the processing to step S19 to instruct the signal processing unit 12 to perform photographing. The image processing unit 12a performs predetermined signal processing on a picked-up image supplied from the image pickup unit 21, and then supplies the picked-up image to the recording unit 16 to record the picked-up image.

When the recording is performed, the image processing unit 12a converts the depth map into metadata (step S20), creates an image file configured by image data based on the picked-up image and information on the depth map converted to the metadata, and records the image file in the recording unit 16 (step S21).

As described above, in the present embodiment, the predetermined target distance range is set, and the image processing for deteriorating visibility is performed on objects which do not belong to the target distance range and are outside the target distance range. As a result, it is possible to relatively enhance the visibility of the objects inside the target distance range. For example, by performing the non-visualization processing on the objects outside the target distance range, only main objects inside the target distance range are visualized and displayed as a visibility-emphasized image, so that the visibility of the main objects can be remarkably enhanced. As a result, even when the main objects and the miscellaneous objects coexist on the two-dimensional display screen, the main objects can be easily viewed and visually recognizable, so that the photographing operation such as composition setting and focusing adjustment can be effectively assisted. Furthermore, the image processing of deteriorating visibility is decided according to whether an object belongs to the target distance range, and it is possible to surely perform visibility-emphasized image display for even an image which is in focus over the whole image area.

Second Embodiment

Figure 9:
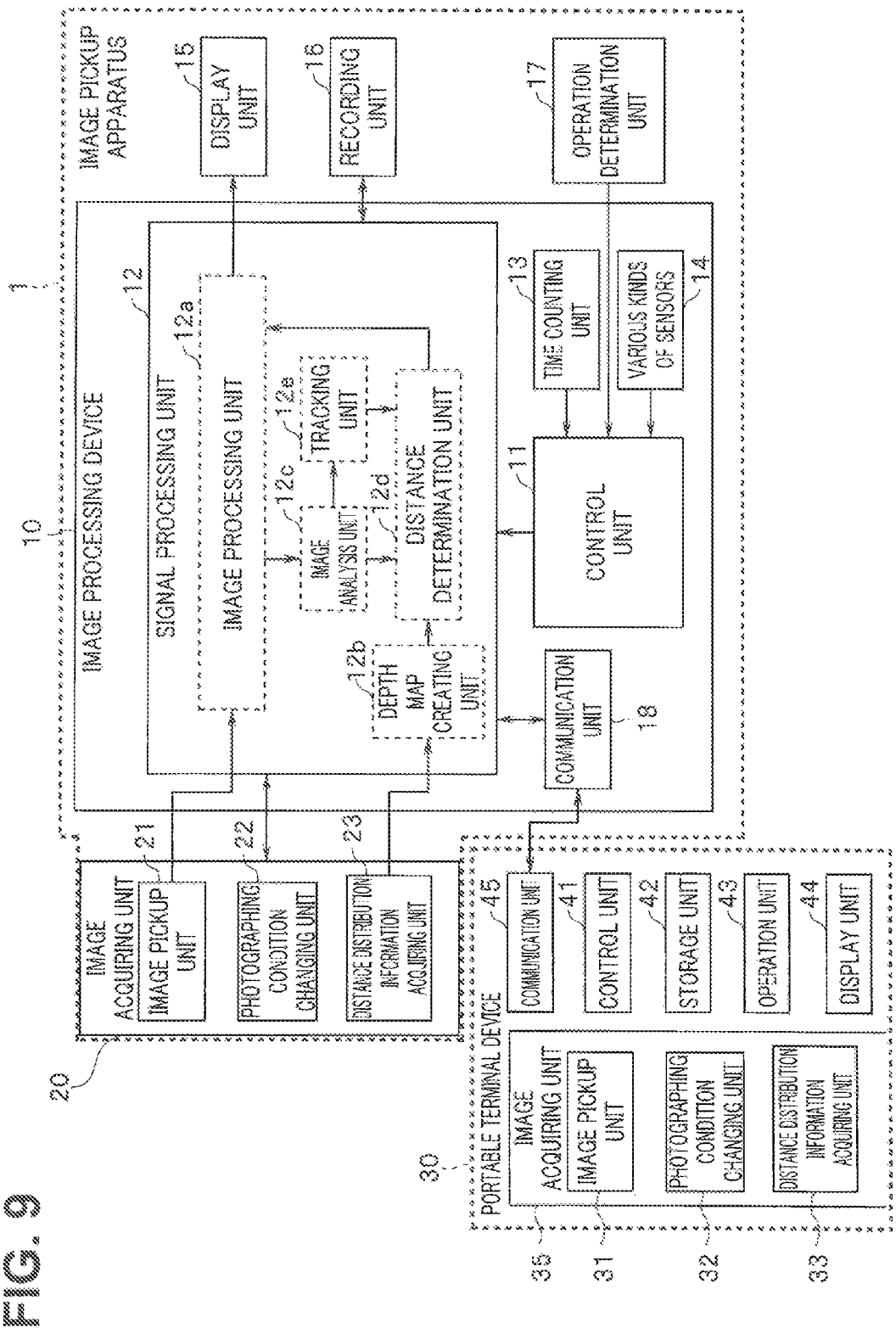
FIG. 9 is a block diagram showing a second embodiment of the present invention.

FIG. 9 is a block diagram showing a second embodiment of the present invention. In FIG. 9, the same components as the components in FIG. 1 are represented by the same reference signs, and duplicative description on the components is omitted. The present embodiment is applied to a case where the image pickup apparatus and the portable terminal perform processing in cooperation with each other.

FIG. 9 shows an example in which an information terminal device 30 and the image pickup apparatus 1 perform image pickup in cooperation with each other. In FIG. 9, the configuration of the image pickup apparatus 1 is similar to the configuration in FIG. 1.

The information terminal device 30 can be configured by, for example, a smartphone. The information terminal device 30 includes an image acquiring unit 35. The image acquiring unit 35 includes an image pickup unit 31, a photographing condition changing unit 32, and a distance distribution information acquiring unit 33. The configurations of the image pickup unit 31, the photographing condition changing unit 32, and the distance distribution information acquiring unit 33 are similar to the configurations of the image pickup unit 21, the photographing condition changing unit 22, and the distance distribution information acquiring unit 23 constituting the image acquiring unit 20. The image acquiring unit 35 can acquire a picked-up image by performing image pickup under a predetermined photographing condition to acquire a picked-up image, and also acquire distance distribution information to an object.

Furthermore, the information terminal device 30 has a control unit 41. The control unit 41 may be configured by a processor using CPU or the like, and operates in accordance with a program stored in a storage unit 42 to control each unit, or may realize a part or the whole of the function by an electronic circuit of hardware. The control unit 41 is configured to be capable of controlling each unit of the information terminal device 30.

Furthermore, the control unit 41 can realize the function of each of the control unit 11 and the signal processing unit 12 of the image pickup apparatus 1 with respect to image pickup and display of picked-up images, for example, by program processing. That is, the control unit 41 has respective processing functions of image signal processing, depth map creation processing, image analysis processing, tracking processing, distance determination processing, display processing, and recording processing, which are processing functions of the signal processing unit 12.

The information terminal device 30 is provided with a display unit 44. The display unit 44 has a display screen such as an LCD, and can display an image given from the control unit 41 on the display screen. Furthermore, the display unit 44 can display various kinds of menu displays and the like on the display screen under the control of the control unit 41.

A touch panel (not shown) as an operation unit 43 is provided on the display screen of the display unit 44. The touch panel can generate an operation signal corresponding to a position on the display screen pointed by a user's finger and a slide operation. This operation signal is supplied to the control unit 41. The control unit 41 operates based on the operation signal.

An image file from the control unit 41 is also stored in the storage unit 42. For example, an IC memory can be adopted as the storage unit 42. Note that the storage unit 42 is also capable of reproducing stored images and is also capable of giving reproduced images to the control unit 41.

The information terminal device 30 has a communication unit 45. The communication unit 45 communicates with external equipment wirelessly or through a wire, so that information can be transferred between the external equipment and the control unit 41. In a cooperation mode, the communication unit 18 of the image pickup apparatus 1 and the communication unit 45 of the information terminal device 30 communicate with each other so that various kinds of information including image information can be mutually transferred between the communication unit 18 and the communication unit 45.

Since the control unit 41 has functions similar to the processing functions of the control unit 11 and the signal processing unit 12 of the image pickup apparatus 1, the control unit 41 can perform the above-described visibility emphasis processing, and display a visibility-emphasized image on the display screen of the display unit 44.

In the present embodiment, when the control unit 41 is provided with a picked-up image from the image pickup apparatus 1, the control unit 41 compares the picked-up image with a picked-up image acquired by the image pickup unit 31, and can display on the display screen of the display unit 44 while a frame image representing a range of the picked-up image from the image pickup apparatus 1 is included in the picked-up image from the image pickup unit 31.

Note that in the foregoing description, the image pickup apparatus 1 and the information terminal device 30 have the same function. However, when processing is performed in cooperation, only one of the apparatus and the device may have all or some of the various kinds of functions in some cases. For example, only one of the apparatus and the device may have the distance distribution information acquiring function, the depth map creating function, and the like.

Figure 10A:
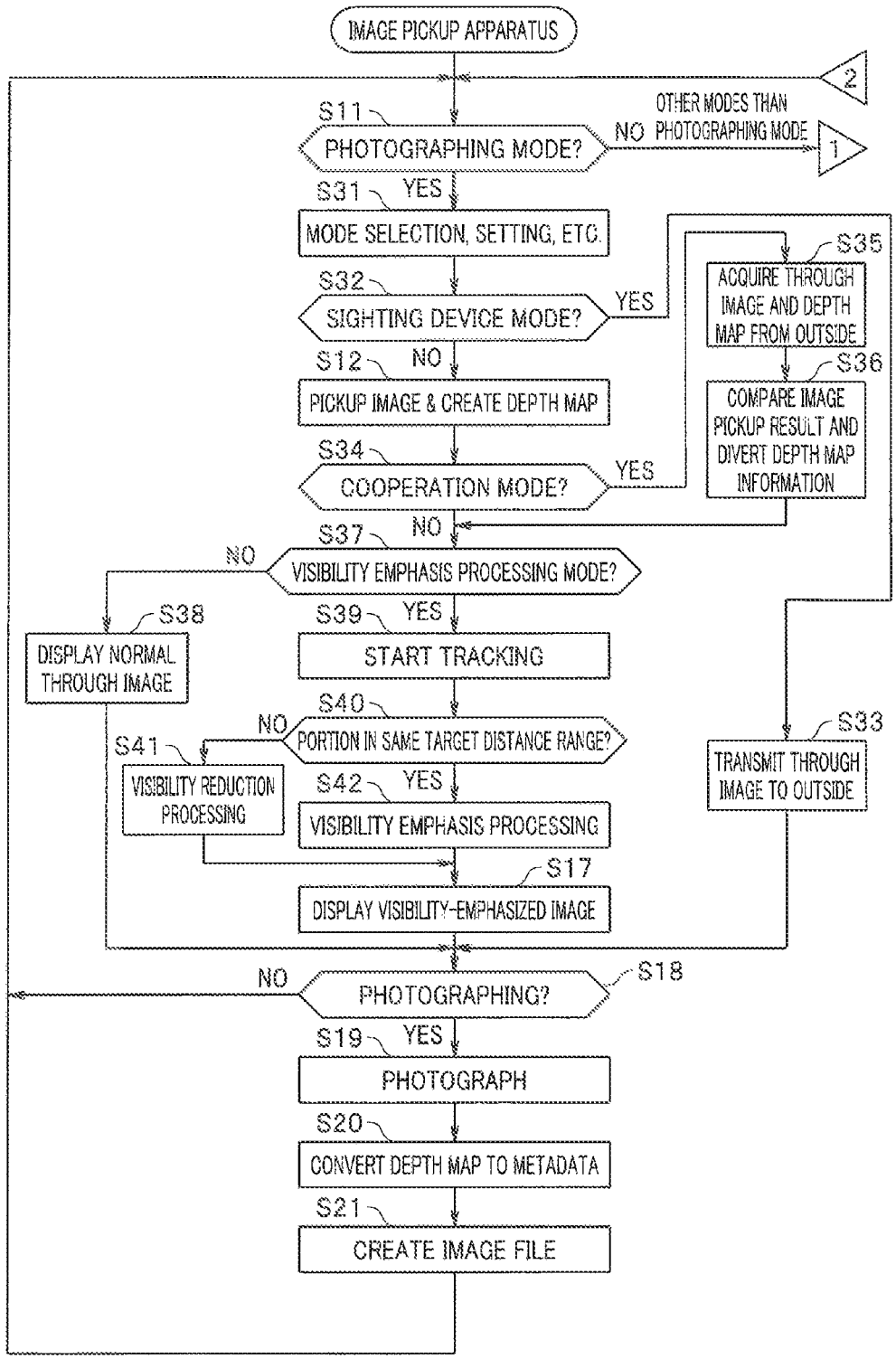
FIG. 10A is a flowchart showing an operation of an image pickup apparatus 1.
Figure 10B:
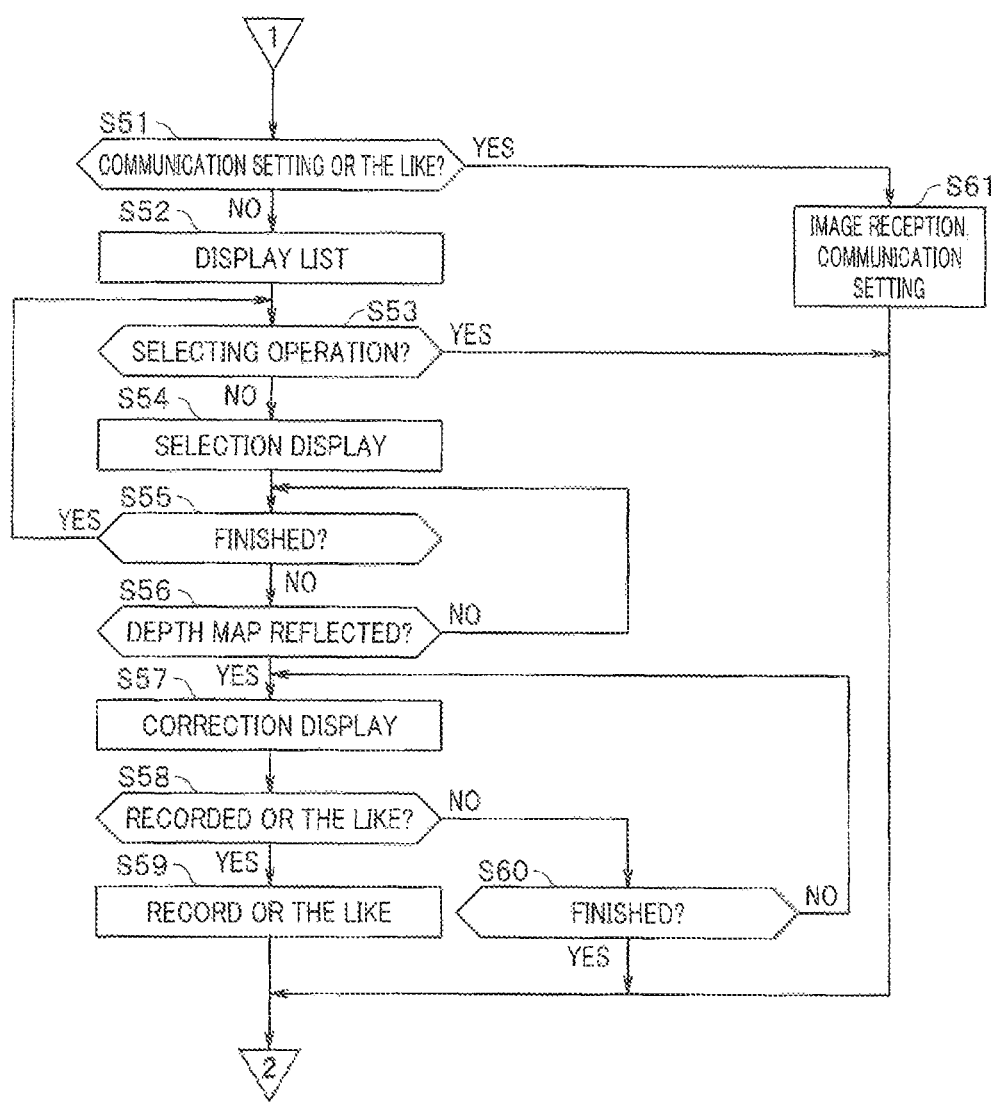
FIG. 10B is a flowchart showing an operation of the image pickup apparatus 1.
Figure 11:
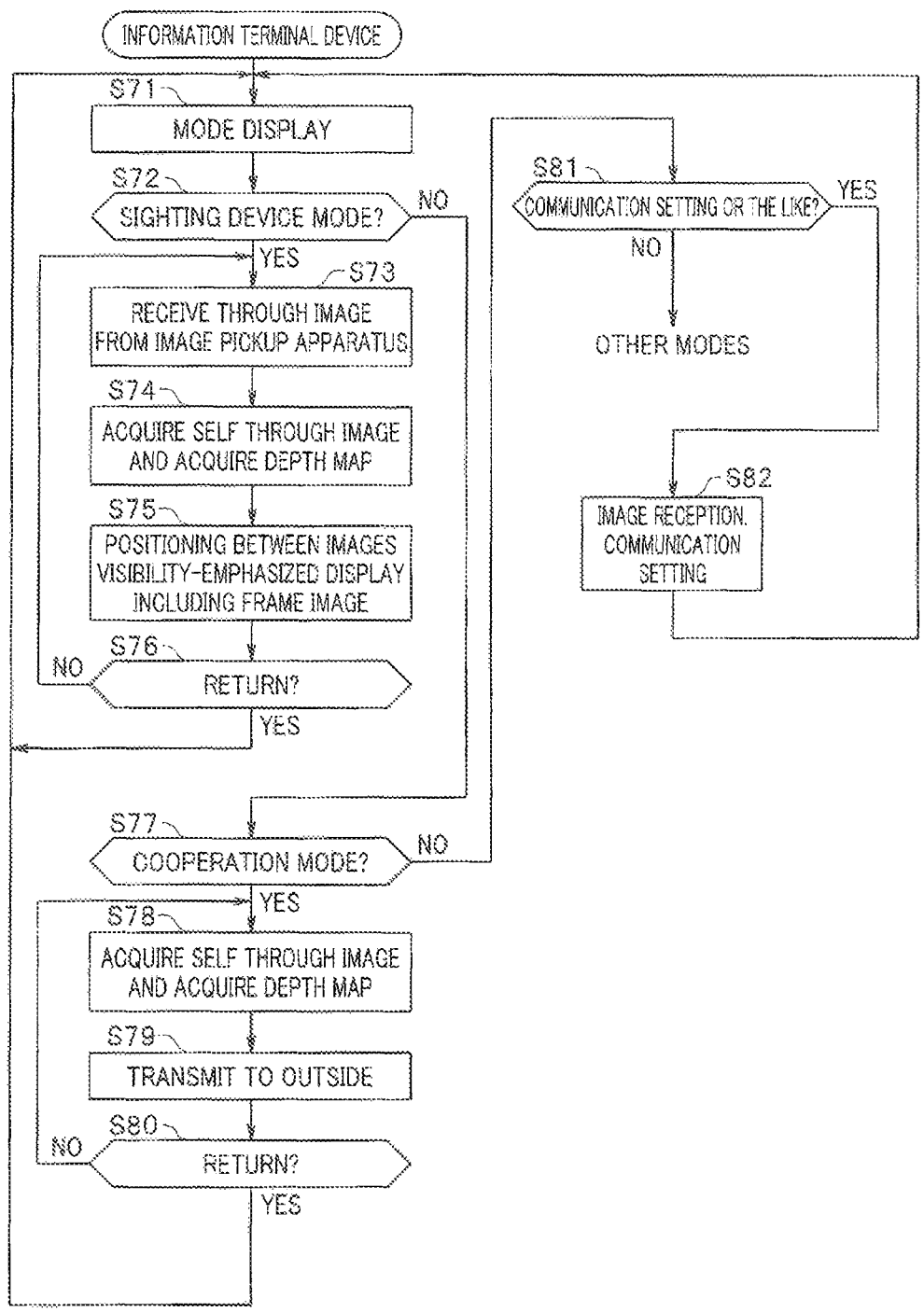
FIG. 11 is a flowchart showing an operation of an information terminal device 30.
Figure 12:
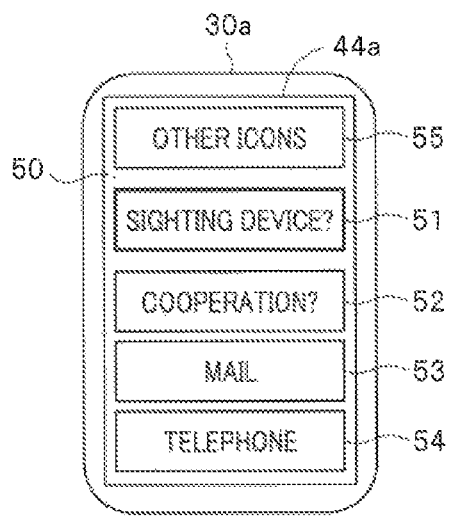
FIG. 12 is an explanatory diagram showing an operation of the second embodiment.
Figure 13:
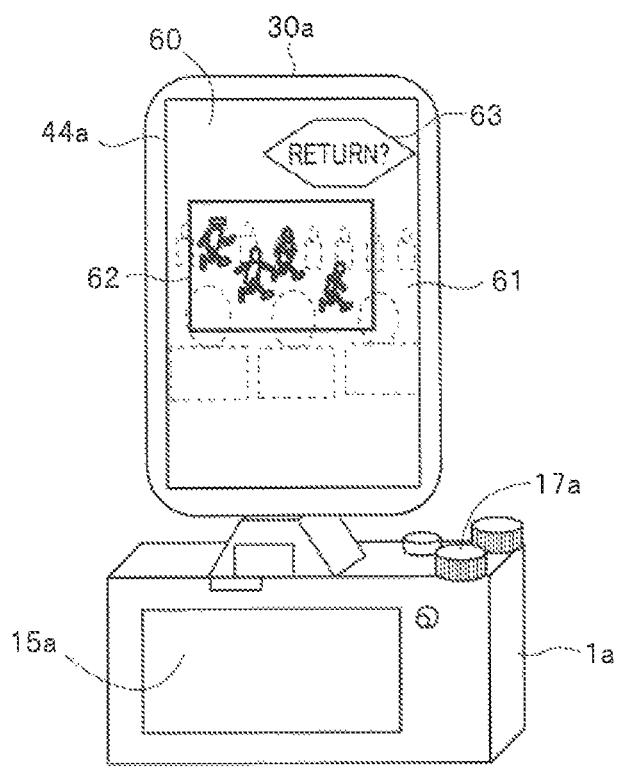
FIG. 13 is an explanatory diagram showing the operation of the second embodiment.

Next, the operation of the thus-configured embodiment will be described with reference to FIGS. 10A and 10B and FIGS. 11 to 13. FIGS. 10A and 10B are flowcharts showing the operation of the image pickup apparatus 1, and show that the processing is linked by same numerals surrounded by triangles in the figures. Note that in FIG. 10A, the same steps as the steps in FIG. 7 are represented by the same reference signs, and description on the steps is omitted. FIG. 11 is a flowchart showing the operation of the information terminal device 30. FIG. 12 and FIG. 13 are explanatory diagrams showing the operation of the embodiment.

In the present embodiment, cooperation shown in FIG. 13 is assumed. That is, the information terminal device 30 is also used as a sighting device of the image pickup apparatus 1. In FIG. 13, each circuit of the image pickup apparatus 1 of FIG. 9 is accommodated in a housing 1a of the image pickup apparatus 1. A shutter button 17a is arranged on an upper surface of the housing 1a of the image pickup apparatus 1, and a display screen 15a of the display unit 15 is provided on a back surface of the housing 1a. The information terminal device 30 is fitted to the upper surface of the housing 1a of the image pickup apparatus 1 by a fitting member (not shown).

Each circuit of the information terminal device 30 of FIG. 9 is accommodated in the housing 30a of the information terminal device 30. A display screen 44a of the display unit 44 is provided on substantially the entire area of the housing 30a on a front surface of the housing 30a of the information terminal device 30. As described above, the touch panel (not shown) as the operation unit 43 is arranged on the display screen 44a, and a user can operate the information terminal device 30 by a touch operation on the display screen 44a while watching display on the display screen 44a.

The control unit 41 of the information terminal device 30 displays a mode menu shown in FIG. 12 in step S71 of FIG. 11. In the example of FIG. 12, a button 51 for setting a sighting mode, a button 52 for setting the cooperation mode, a button 53 for selecting an e-mail mode, a button 54 for setting a telephone mode, and various kinds of icon displays 55 for selecting other modes are displayed on the display screen 44a.

In next step S72, the control unit 41 determines whether the sighting device mode is specified. The sighting device mode is a mode in which the information terminal device 30 is used as the sighting device of the image pickup apparatus 1. In this case, the user performs the photographing operation while watching a through image displayed on the display screen 44a of the information terminal device 30 when image pickup is performed by the image pickup apparatus 1. In the present embodiment, in this case, a visibility-emphasized image is displayed on the display screen 44a.

When determining in step S11 of FIG. 10A that the photographing mode is instructed, the control unit 11 of the image pickup apparatus 1 performs mode selection and various kinds of settings in step S31. The control unit 11 determines in S32 whether the sighting device mode is specified. When the sighting device mode is specified by the user, the control unit 11 shifts the processing to step S33 to transmit a through image to the information terminal device 30. That is, in the sighting device mode, the image pickup apparatus 1 transmits a normal through image without performing the visibility emphasis processing.

In step S73, the control unit 41 of the information terminal device 30 receives the through image from the image pickup apparatus 1. In step S74, the control unit 41 acquires the through image which the image pickup unit 31 acquires by image pickup, and acquires distance distribution information from the distance distribution information acquiring unit 33. The control unit 41 creates a depth map of the picked-up image from the distance distribution information. The control unit 41 performs visibility emphasis processing similar to the visibility emphasis processing of the first embodiment to acquire a visibility-emphasized image based on the through image which the image pickup unit 31 acquires by image pickup. Furthermore, by comparing the through image acquired by the image pickup unit 31 with the through image received from the image pickup apparatus 1, a frame image representing a photographing range of the through image of the image pickup apparatus 1 is superimposed on the visibility-emphasized image, and displayed on the display screen 44a (step S75).

FIG. 13 shows an image 60 displayed on the display screen 44a in the above case. A visibility-emphasized image 61 corresponding to the image in FIG. 3A is included in an image 60. Furthermore, a frame image 62 representing the photographing range of the through image being picked up by the image pickup apparatus 1 is also displayed in the image 60. Still furthermore, a return button 63 for terminating the sighting device mode and returning to the mode menu is also displayed in the image 60.

In step S76, the control unit 41 determines whether the return button 63 has been operated. When the return operation has not been performed, the control unit 41 returns the processing to step S73 and continues display of the image 60. When the return operation has been performed, the control unit 41 returns the processing to step S71 to display the mode menu.

The image 60 in FIG. 13 is a visibility-emphasized image, and the frame image 62 representing the photographing range of the image pickup apparatus 1 is also displayed. The user can easily check main objects by watching the image 60 displayed on the display screen 44a, also can check objects in a field-of-view range broader than the photographing range of the image pickup apparatus 1, and can also easily know a range in which the image pickup apparatus 1 performs image pickup in the broader field-of-view range. As a result, the user can remarkably easily perform image composition and focusing adjustment for photographing the main objects.

Incidentally, although the image pickup apparatus 1 in FIG. 9 has all the functions for acquiring the visibility-emphasized image, an image pickup apparatus which does not have the depth map creating function or is originally uncapable of acquiring the distance distribution information may be adopted in some cases. Even in such a case, by adopting the cooperation mode, it is possible to display the visibility-emphasized image by using information from the information terminal device 30.

When determining in step S32 that the sighting device mode for displaying the visibility-emphasized image on the display screen 44a of the information terminal device 30 is not specified, in next step S12, the control unit 11 of the image pickup apparatus 1 performs image pickup and also creates a depth map. Only image pickup is performed in the image pickup apparatus that does not have the depth map creating function. Next, the control unit 11 determines in step S34 whether the cooperation mode is specified. When the cooperation mode has not been specified, the control unit 11 generates a visibility-emphasized image by using the function of the apparatus having the control unit 11.

That is, the control unit 11 determines in the following step S37 whether the visibility emphasis processing mode has been set. Note that in the visibility emphasis processing mode, the target distance range is determined based on an object specified by the touch operation or an object in the center of the screen. When such setting is not performed, the control unit 11 shifts the processing to step S38 to perform the normal through image display. On the other hand, when the visibility emphasis processing mode is specified, the control unit 11 controls the tracking unit 12*e* in next step S39 to start tracking of the object specified by the touch operation or the object in the center of the screen. As a result of this tracking, the distance determination unit 12*d* sets a predetermined distance range including the object as a tracking target to the target distance range, and determines whether each object or each portion or each area within the screen belongs to the target distance range (step S40).

Note that the control unit 11 may use a predetermined distance range as the predetermined distance range for determining the target distance range, or may set the object as the tracking target to a main object and use distances to miscellaneous objects, or may instruct the distance determination unit 12*d* with distances including the distance to an object that makes a movement similar to the movement of the object as the tracking target. The control unit 11 performs visibility reduction processing on objects outside target distance which do not belong to the target distance range in step S41, and performs processing of relatively enhancing visibility on objects inside target distance which belong to the target distance range in step S42. However, the processing may be changed with lapse of time according to the movement of the target object.

For example, when a target object located at a distance of 3 m at the beginning comes to between miscellaneous objects at a distance of 2 m while moving horizontally, a device can be performed which makes the visibility of a portion at the distance of 3 m excellent at the beginning, and thereafter keeps the visibility of the target object, but subjects the other portions to visibility monotonization processing. In addition, at this time, the visibility monotonization processing may be performed on an object which newly enters the portion at the distance of 3 m. Under such circumstances, the distance in step S40 changes moment by moment, and particularly, YES in step S40 becomes a little more complicated processing. That is, even when the distance of an object is equal to the distance of the target object, the processing to be performed on the object corresponds to the processing in step S41 which rather reduces the visibility. This flowchart is simplified, and actually, in a case where tracking has been achieved, the processing in step S42 is the processing of "relatively enhancing the visibility of the tracking target and subjecting the other objects to the monotonization processing". That is, simply, the visibility representation of image areas corresponding to map coordinates may be changed based on the depth map, but with respect to a specific object which is detected to be good in visibility in the manner as described above, the visibility of the specific object is kept irrespective of the depth map.

As described above, under a condition where the specific object is being tracked, the distance of the tracking target object is being determined moment by moment, and the visibility of image pickup target objects which are different in distance from the tracking target object may be subjected to the monotonization processing.

Furthermore, the control unit 11 may exclude the object as the tracking target from processing target of the visibility monotonization processing using the depth map while the visibility monotonization processing is performed on objects outside the target distance range which do not belong to the target distance range set based on the depth map. For example, in a case where plural runners in a footrace are set as main objects belonging to a target distance range based on a depth map and further a specific one of the runners is tracked as a tracking target, even when the runner as the tracking target falls into a state where the runner does not belong to the target distance range, the control unit 11 may perform control so that the tracking target is excluded from the processing target of the visibility monotonization processing, and the runners inside the target distance range and the runner as the tracking target are kept good in visibility.

Furthermore, the target distance range in this case may be changed according to variation in distance to the other runners so that the other runners are included within the target distance range.

That is, the image processing device can be configured to include a distance determination unit configured to determine an image portion inside a target distance range that is a predetermined distance range in an image displayed on a display unit and an image portion outside the target distance range in the image based on a depth map of the image displayed on the display unit, an image analysis unit configured to detect an object in the image displayed on the display unit, a tracking unit configured to track a movement in the image of a specific object detected by the image analysis unit, and an image processing unit configured to subject at least the image portion outside the target distance range to image processing of monotonizing visibility and display the image portion on the display unit, and exclude the specific object being tracked by the tracking unit from a target of the image processing of monotonizing visibility even when the specific object is outside the target distance range.

In step S17, the control unit 11 displays a visibility-emphasized image obtained by combining the above processed images on the display screen 15*a* of the display unit 15.

Next, it is assumed that the cooperation mode is specified. The control unit 11 of the image pickup apparatus 1 determines based on an operation signal from the operation determination unit 17 that the cooperation mode is specified. Furthermore, the control unit 41 of the information terminal device 30 determines based on a touch operation of the button 52 of FIG. 12 that the cooperation mode is specified.

In step S77, the control unit 41 determines whether the cooperation mode is specified. When the cooperation mode is specified, the control unit 41 acquires a through image from the image pickup unit 31, creates a depth map based on the through image (step S78), and transmits the depth map to the outside (step S79). In step S80, the control unit 41 determines execution or non-execution of the return operation. When the return operation is executed, the control unit 41 returns the processing to step S71 and continues transmission of the through image and the depth map in steps S78 and S79 until the return operation is executed.

On the other hand, when determining that the cooperation mode is specified in step S34, in step S35, the control unit 11 of the image pickup apparatus 1 is configured to receive and acquire a through image and a depth map from the information terminal device 30 via the communication units 18 and 45. In step S36, the control unit 11 compares the through image acquired by the image pickup unit 21 and the through image received from the information terminal device 30, creates a depth map corresponding to the through image acquired in the image pickup unit 21 based on the depth map received from the information terminal device 30, and then shifts the processing to step S37. Therefore, in this case, the visibility emphasis processing using the depth map acquired by the information terminal device 30 is performed in the steps from step S37 to step S17, and a visibility-emphasized image is displayed on the display screen 15a of the display unit 15.

Furthermore, although not shown in FIG. 10A, when the depth map has been created in the image pickup apparatus 1, it is also possible to perform visibility emphasis processing using both the depth map received from the information terminal device 30 and the depth map created in the image pickup apparatus 1. For example, the depth maps may be selectively used according to a photographing scene. For example, in a case where a twin-lens image pickup unit is adopted in the information terminal device 30, it is considered that the distance accuracy in a horizontal direction is relatively high, but the distance accuracy in a vertical direction is relatively low due to restriction to the arrangement. Therefore, the control unit 11 may use the depth map from the information terminal device 30 for an object having a pattern variation in the horizontal direction, and may use the depth map created by the image pickup apparatus 1 for other objects. Furthermore, in the information terminal device 30, it is considered that the distance accuracy for a predetermined intermediate distance is relatively high, but the distance accuracy for the vicinity of a far end or the vicinity of a near end is relatively low due to restriction to the arrangement. Therefore, when the object distance is an intermediate distance, the control unit 11 uses the depth map from the information terminal device 30, and when the object distance is extremely near or far, the control unit 11 uses the depth map created in the image pickup apparatus 1.

Since the importance of the technique of the present application is different between a cluttered scene and a tidy scene, the present image processing of monotonization representation is not performed for tidy scenes, but the monotonization processing is adopted for cluttered scenes. Furthermore, when the main object (main target object) moves while mixing with miscellaneous objects (other objects than the main object), the monotonization processing is not performed because discrimination is difficult, or in such a situation that the scene shifts from a tidy scene to a cluttered scene, a device may be performed which continuously tracks and displays a main target object which has been discriminable in a tidy scene at the beginning while the other objects are monotonized, thereby keeping the visibility.

When determining in step S77 that the cooperation mode is not set, the control unit 41 of the information terminal device 30 shifts the processing to step S81 to determine whether a communication setting mode is specified. When the communication setting mode is specified, the control unit 41 receives an image from the image pickup apparatus 1 in step S82, performs communication setting, and returns the processing to step S71. When the communication setting mode is not specified, the control unit 41 executes another mode.

When determining in step S11 that the photographing mode is not specified, the control unit 11 of the image pickup apparatus 1 shifts the processing to step S51 in FIG. 10B to determine whether the communication setting mode is specified. When the communication setting mode is specified, the control unit 11 returns the processing to step S11 after performing image reception and communication setting in step S61. When determining that the communication setting mode has not been set, the control unit 11 determines that the reproduction mode is specified, and in next step S52, the control unit 11 reads out, from the recording unit 16, images which have been already recorded, and provides the images to the display unit 15 to display a list of the images. The control unit 11 determines in next step S53 whether a selection operation has been performed. When the selection has been performed, a selected image is displayed on the display screen 15a in step S54.

Note that when determining in step S53 that the selection operation has not been performed for a predetermined time of period, the control unit 11 returns the processing to step S11. After displaying the selected image, the control unit 11 determines whether a terminating operation has been performed (step S55). When the terminating operation is performed, the control unit 11 returns the processing to step S53, and when the terminating operation is not performed, the control unit 11 shifts the processing to step S56.

In step S56, the control unit 11 determines an inquiry about whether the information of the depth map recorded in the recording unit 16 is reflected to the display. When depth map reflection is specified by a user's instruction, the control unit 11 controls the image processing unit 12a in next step S57 to correct the selected image by using the depth map, and then provides this image to the display unit 15 to display the image on the display screen 15a. For example, such correction that the shade of the selected image is changed according to the distance may be considered. Note that the visibility-emphasized image may be displayed in this correction display.

When the depth map reflection is not specified, the control unit 11 returns the processing from step S56 to step S55. The control unit 11 determines in step S58 whether recording or the like has been instructed. When recording or the like has been instructed, the control unit 11 provides the image corrected in step S57 to the recording unit 16 to record the image, and when recording or the like has not been instructed, the control unit 11 determines the terminating operation in step S60. When determining in step S60 that the terminating operation has not been performed, the control unit 11 returns the processing to step S57, and when determining that the terminating operation has been performed, the control unit 11 returns the processing to step S11.

As described above, in the present embodiment, it is possible to perform image pickup based on the cooperation between the image pickup apparatus and the information terminal device. For example, the information terminal device can be used as a sighting device of the image pickup apparatus. In this case, a visibility-emphasized image is displayed in a field-of-view range broader than the photographing range of the image pickup apparatus, and also an image representing the photographing range of the image pickup apparatus can be displayed in the visibility-emphasized image, so that the user can more easily perform setting of image composition, focusing adjustment, and the like. Even when the image pickup apparatus does not have some or all of the functions of the visibility emphasis processing, it is possible to display the visibility-emphasized image by using the information from the information terminal device.

In each of the embodiments of the present invention, a camera of a portable terminal such as a normal camera or a smartphone is used as a device for photographing. However, any image pickup apparatus can be adopted as long as the image pickup apparatus can acquire a photographed image, and when not restricted by an installation location, it is needless to say that the image pickup apparatus may include a lens type camera, a digital single-lens reflex camera, a compact digital camera, a camera for moving pictures such as a video camera or a movie camera, and further a camera incorporated in a portable information terminal (PDA: personal digital assistant) such as a cellular phone or a smartphone. Furthermore, the image pickup apparatus may include industrial or medical optical equipment such as an endoscope or a microscope, a surveillance camera, an in-vehicle camera, a stationary camera, for example, a camera attached to a television receiver, a personal computer, or the like.

As described above, the present technique can be utilized in various types of equipment, but depending on the type of the equipment, in the above embodiments, the examples in which the user does not move and the target object moves have been mainly described. However, the user or the image pickup apparatus side moves, so that the relative distance to the target object may vary. Even in such a situation, a case where the processing of changing the visibility is performed on a target object at a specific relative distance and other objects is included in the scope of the present application. For example, in the case of a microscope or an endoscope, an observation device side may move in addition to movement of an observation target, and in the case of a camera mounted in a drone, the camera can likewise approach to a target object. "Tracking" in such a case is a countermeasure to sight-losing caused by variation of the relative distance which occurs due to change of the position of the device even when the target object side is stationary. A target object to be viewed is determined, and the image processing (reduction of visibility, monotonization, flattening processing, etc.) is performed so as to compare a depth map at the time of the determination with a depth map when the distance of the determined target object varies, keep or enhance the visibility of a portion of depth information of map coordinates corresponding to the target object (which may be referred to as distance distribution information), and with respect to display of portions corresponding to the other distances than the distance to the target object, distract the user from discrimination as to what the other portions are.

Furthermore, in the embodiments, the portions described as "units" may be configured by dedicated circuits or combining plural general-purpose circuits, or may be configured by combining a microprocessor which operates according to software programmed in advance as needed, and a processor such as CPU or a sequencer. Furthermore, a design may be performed such that an external device takes over a part or the whole of the control, and in this case, a wired or wireless communication circuit is interposed. Hereinafter, for the purpose of simplification, the communication unit may not be specially described, but an embodiment in which the characteristic processing and supplementary processing of the present application is performed by an external device such as a server or a personal computer is also assumed. That is, the present application also covers even a case where plural devices cooperate with one another to establish the features of the present invention. Bluetooth (registered trademark), Wi-Fi (registered trademark), a telephone line or the like is used for communication at this time. USB or the like may be used for communication at this time. A dedicated circuit, a general-purpose circuit and a control unit may be integrated and configured as an ASIC. Such a device or system may have functions of applying some action on the user, changing the angle of parts, etc. A mechanism for the functions is configured by various actuators and, if necessary, a coupling mechanism, and the actuator is operated by a driver circuit. This drive circuit is also controlled by a microprocessor microcomputer, ASIC or the like according to a specific program. Such control may be subjected to detailed correction or adjustment according to information outputted from various kinds of sensors and peripheral circuits around the sensors.

The present invention is not limited to the above embodiments with no modification, and the components may be modified and embodied at the implementation stage without departing from the subject matter of the present invention. Furthermore, various inventions may be formed by properly combining plural components disclosed in the respective embodiments. For example, some components of all the components shown in the embodiments may be deleted. Furthermore, the components over the different embodiments may be appropriately combined.

Note that even when the operation flows in the claims, the specification and the drawings are described by using "first", "next", etc., the description does not mean that it is indispensable to execute the operation flows in this order. Furthermore, it is needless to say that the steps configuring these operation flows can be appropriately omitted insofar as the steps do not affect the essence of the invention.

Among the techniques described here, most of the controls and functions described mainly with reference to the flowcharts can be set by a program, and a computer can realize the above-described controls and functions by reading and executing the program. As a computer program product, the program may be recorded or stored partially or wholly in a portable medium such as a flexible disk, CD-ROM or a nonvolatile memory, or a storage medium such as a hard disk or a volatile memory, and can be distributed or provided at the time of shipment of products or via a portable medium or a communication line. The user can easily realize the image processing device of the present embodiments by downloading the program via a communication network and installing the program in a computer or installing the program from the recording medium into the computer.

What is claimed is:

1. An image processing device comprising a signal processing device, wherein the signal processing device is configured to perform distance determination processing of determining, based on a depth map regarding an image for display on a display, an image portion inside a target distance range which is a predetermined distance range in the image, and an image portion outside the target distance range, and perform image processing of subjecting at least the image portion outside the target distance range to image processing of monotonizing visibility based on a determination result of the distance determination processing and displaying the image on the display.

2. The image processing device according to claim 1, wherein the signal processing device further performs image analysis processing of detecting objects in the image for display on the display, the distance determination processing determines for each of the objects detected in the image analysis processing whether the object exists inside the target distance range or outside the target distance range, and the image processing subjects at least an image portion of an object outside the target distance range to the image processing of monotonizing visibility based on a determination result of the distance determination processing.

3. The image processing device according to claim 2, wherein the target distance range including an object distance of a main object in the objects detected in the image analysis processing is set in the distance determination processing.

4. The image processing device according to claim 3, wherein the signal processing device further performs tracking processing of tracking movement in the image for each of the objects detected in the image analysis processing, and in the distance determination processing, the target distance range is set according to the object distance of the main object tracked in the tracking processing.

5. The image processing device according to claim 3, wherein the main object is specified by a user's operation.

6. The image processing device according to claim 3, wherein in the distance determination processing, the target distance range is set according to a distance from the main object to a miscellaneous object.

7. The image processing device according to claim 1, wherein the image processing is adapted to perform image processing of making the image portion outside the target distance range invisible and visualizing only the image portion inside the target distance range.

8. The image processing device according to claim 1, further comprising a depth map creating unit configured to create the depth map.

9. An image pickup apparatus comprising:
the image processing device according to claim 1;
the display; and
an image pickup unit configured to pick up an image for display on the display.

10. The image pickup apparatus according to claim 9, wherein the image pickup unit is configured to acquire a stereoscopic image for creating the depth map.

11. The image pickup apparatus according to claim 9, wherein in the distance determination processing, the depth map acquired by external equipment is received, and the image portion inside the target distance range and the image portion outside the target distance range are determined.

12. An image processing method comprising:
based on a depth map regarding an image for display on a display, determining an image portion inside a target distance range which is a predetermined distance range in the image, and an image portion outside the target distance range; and
based on a determination result of the distance determination processing, subjecting at least the image portion outside the target distance range to image processing of monotonizing visibility to display the image on the display.

13. A non-transitory computer-readable recording medium in which an image processing program for causing a computer to execute a procedure is stored, the procedure comprising:
based on a depth map concerning an image for display on a display, determining an image portion inside a target distance range which is a predetermined distance range in the image, and an image portion outside the target distance range; and
based on a determination result of the distance determination processing, subjecting at least the image portion outside the target distance range to image processing of monotonizing visibility to display the image on the display.

14. An image processing device including a signal processing device, wherein the signal processing apparatus is configured to:
perform distance determination processing of determining, based on a depth map concerning an image for display on a display, an image portion inside a target distance range which is a predetermined distance range in the image, and an image portion outside the target distance range;
perform image analysis processing of detecting an object in the image displayed on the display;
perform tracking processing of tracking movement in the image of a specific object detected in the image analysis processing; and
perform image processing of subjecting at least the image portion outside the target distance range to image processing of monotonizing visibility based on a determination result of the distance determination processing to display the image on the display, and excluding a specific object under tracking in the tracking processing from targets of the image processing of monotonizing visibility even when the specific object is located outside the target distance range.

15. The image processing device according to claim 14, wherein in the distance determination processing, the target distance range is set in accordance with movement of a main object in objects detected in the image analysis processing so that an object distance of the main object is included in the target distance range.

16. An image processing method comprising:
determining, based on a depth map concerning an image for display on a display, an image portion inside a target distance range which is a predetermined distance range in the image, and an image portion outside the target distance range;
detecting an object in the image displayed on the display;
tracking movement in the image of a specific object detected by the detection of the object; and
performing image processing of subjecting at least the image portion outside the target distance range to image processing of monotonizing visibility based on a determination result of the determination to display the image on the display, and excluding a specific object under tracking in the tracking processing from targets of the image processing of monotonizing visibility even when the specific object is located outside the target distance range.

17. A non-transitory computer-readable recording medium in which an image processing program for causing a computer to execute a procedure is stored, the procedure comprising:
determining, based on a depth map concerning an image for display on a display, an image portion inside a target distance range which is a predetermined distance range in the image, and an image portion outside the target distance range;
detecting an object in the image for display on the display;
tracking movement in the image of a specific object detected by the detection of the object; and
performing image processing of subjecting at least the image portion outside the target distance range to image processing of monotonizing visibility based on a determination result of the determination to display the image on the display, and excluding a specific object under tracking in the tracking processing from targets of the image processing of monotonizing visibility even when the specific object is located outside the target distance range.

* * * * *